(12) United States Patent
Hitchcock

(10) Patent No.: US 11,225,843 B2
(45) Date of Patent: Jan. 18, 2022

(54) COMPOSITE DUAL CHANNEL DRILL PIPES AND METHOD OF MANUFACTURE

(71) Applicant: Saudi Arabian Oil Company, Dhahran (SA)

(72) Inventor: Graham Hitchcock, Aberdeenshire (GB)

(73) Assignee: Saudi Arabian Oil Company, Dhahran (SA)

(*) Notice: Subject to any disclaimer, the term of this patent is extended or adjusted under 35 U.S.C. 154(b) by 208 days.

(21) Appl. No.: 16/528,886

(22) Filed: Aug. 1, 2019

(65) Prior Publication Data
US 2021/0032943 A1 Feb. 4, 2021

(51) Int. Cl.
*B29D 23/00* (2006.01)
*B29L 24/00* (2006.01)
(Continued)

(52) U.S. Cl.
CPC .......... *E21B 17/18* (2013.01); *B29C 66/1122* (2013.01); *B29C 66/5221* (2013.01);
(Continued)

(58) Field of Classification Search
CPC ......... B29C 70/24; B29C 70/30; B29C 70/52; B29C 66/112; B29C 66/1122; B29C 66/5221; B29C 66/5229; B29C 66/52291; B29C 66/52292; B29C 66/52293; B29C 70/083; B29C 70/22; B29C 70/222;
(Continued)

(56) References Cited

U.S. PATENT DOCUMENTS 3,464,450 A * 9/1969 Francesco ............... B29C 48/33
138/113
3,769,127 A * 10/1973 Goldsworthy ........ B29C 70/525
156/172
(Continued)

FOREIGN PATENT DOCUMENTS

EP 0593784 A1 4/1994
GB 1075435 7/1967
(Continued)

OTHER PUBLICATIONS

International Search Report & Written Opinion for International Application No. PCT/US2020/044467, repor mail date Oct. 8, 2020; pp. 1-10.

*Primary Examiner* — Michael A Tolin
(74) *Attorney, Agent, or Firm* — Bracewell LLP; Constance G. Rhebergen; Vivek P. Shankam

(57) ABSTRACT

A composite drill pipe including an inner pipe having a first diameter, an outer pipe having a second diameter greater than the first diameter, and a plurality of flow channels formed between the inner pipe and the outer pipe. The plurality of flow channels are formed by a plurality of walls extending radially between an outer diameter of the inner pipe and an inner diameter of the outer pipe. A method of forming a composite drill pipe includes pultruding a drill pipe comprising an inner pipe having a first diameter, an outer pipe having a second diameter greater than the first diameter, and a plurality of flow channels formed between the inner pipe and the outer pipe. The method also includes providing a multi-directional reinforcement over an outer diameter of the outer pipe.

14 Claims, 6 Drawing Sheets

(51) Int. Cl.
*B32B 1/08* (2006.01)
*B32B 3/26* (2006.01)
*B32B 5/26* (2006.01)
*E21B 17/04* (2006.01)
*E21B 17/18* (2006.01)
*E21B 47/00* (2012.01)
*E21B 47/12* (2012.01)
*E21B 7/04* (2006.01)
*F16L 39/00* (2006.01)
*F16L 9/19* (2006.01)
*B29C 70/52* (2006.01)
*B29C 70/30* (2006.01)
*B29C 70/08* (2006.01)
*B29C 65/00* (2006.01)

(52) U.S. Cl.
CPC ............ *B29C 70/083* (2013.01); *B29C 70/30* (2013.01); *B29C 70/52* (2013.01); *B29D 23/003* (2013.01); *B32B 1/08* (2013.01); *B32B 3/26* (2013.01); *B32B 5/26* (2013.01); *E21B 17/04* (2013.01); *E21B 47/00* (2013.01); *E21B 47/12* (2013.01); *F16L 9/19* (2013.01); *F16L 39/00* (2013.01); *B29L 2024/006* (2013.01); *B32B 2597/00* (2013.01); *E21B 7/04* (2013.01)

(58) Field of Classification Search
CPC ................. B29C 23/003; B29C 23/005; B29L 2024/006; B32B 1/08; B32B 3/26; B32B 5/26; B32B 2597/00; E21B 7/04; E21B 17/04; E21B 17/18; E21B 21/12; E21B 47/00; E21B 47/12; E21B 17/02; E21B 17/023; B29D 23/003; B29D 23/005; F16L 9/18; F16L 9/19; F16L 39/00; F16L 39/005

See application file for complete search history.

(56) References Cited

U.S. PATENT DOCUMENTS

| | | | |
|---|---|---|---|
| 4,618,172 A | 10/1986 | Becker | |
| 4,759,571 A | 7/1988 | Stone et al. | |
| 5,332,049 A | 7/1994 | Tew | |
| 6,050,612 A | 4/2000 | Wolterman | |
| 6,061,902 A * | 5/2000 | Kalamkarov | H01B 15/005 29/825 |
| 6,742,547 B2 * | 6/2004 | Bryn | D03D 41/00 139/11 |
| 7,140,859 B2 | 11/2006 | Herrington | |
| 7,458,617 B2 | 12/2008 | Leslie et al. | |
| 9,810,353 B2 | 11/2017 | Leslie et al. | |
| 2003/0167728 A1 | 9/2003 | Mohlenhoff | |
| 2005/0103527 A1 | 5/2005 | Church et al. | |
| 2006/0245989 A1 * | 11/2006 | Miller | F16L 9/19 422/211 |
| 2008/0057249 A1 | 3/2008 | Herrington | |
| 2015/0053293 A1 | 2/2015 | Ophaug | |

FOREIGN PATENT DOCUMENTS

| | | |
|---|---|---|
| GB | 2344127 A | 5/2000 |
| KR | 100878178 B1 | 1/2009 |
| KR | 20110057473 A | 6/2011 |
| KR | 20130138668 A | 12/2013 |
| WO | 199908033 | 2/1999 |
| WO | 200005506 A2 | 2/2000 |
| WO | 2013168981 A1 | 11/2013 |

* cited by examiner

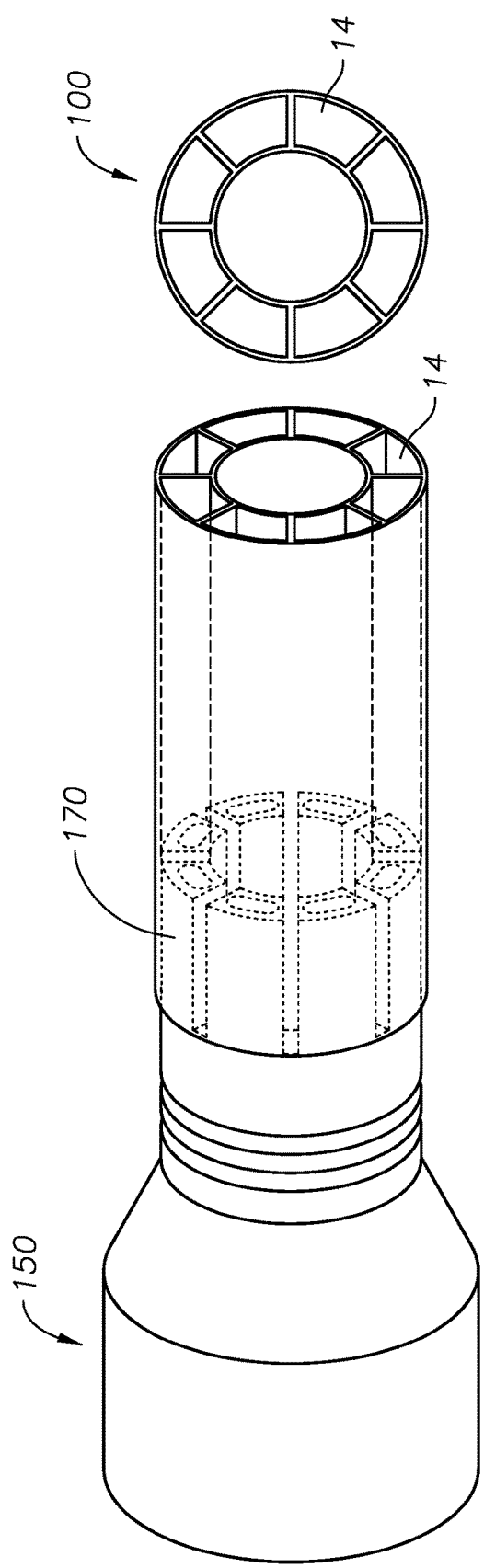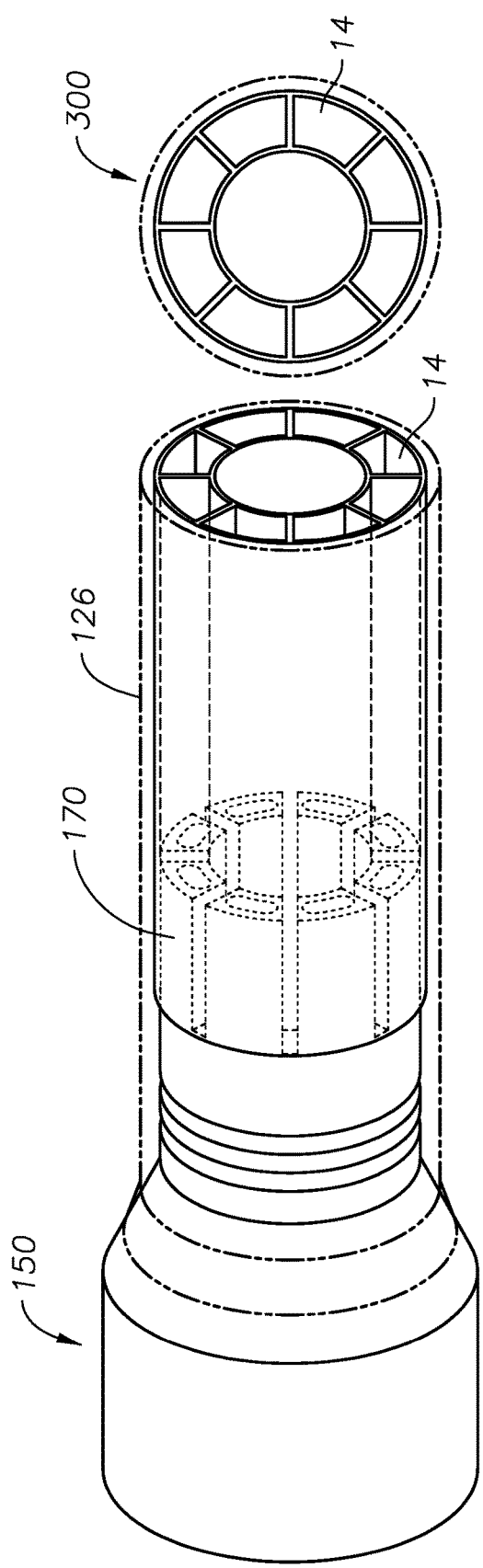
FIG. 4A
FIG. 4B

COMPOSITE DUAL CHANNEL DRILL PIPES AND METHOD OF MANUFACTURE

BACKGROUND

1. Technical Field

Embodiments relate generally to developing wells, and more particularly to drill pipes used in the oil and gas industry.

2. Description of Related Art

A well generally includes a wellbore (or "borehole") that is drilled into the earth to provide access to a geologic formation below the earth's surface (or "subsurface formation"). The well may facilitate the extraction of natural resources, such as hydrocarbons and water, from the subsurface formation, facilitate the injection of substances into the subsurface formation, or facilitate the evaluation and monitoring of the subsurface formation. In the petroleum industry, hydrocarbon wells are often drilled to extract (or "produce") hydrocarbons, such as oil and gas, from subsurface formations. The term "oil well" is often used to refer to a well designed to produce oil. Similarly the term "gas well" is often used to refer to a well designed to produce gas. In the case of an oil well, some natural gas is typically produced along with oil. A well producing both oil and natural gas is sometimes referred to as an "oil and gas well" or an "oil well." The term "hydrocarbon well" is often used to describe wells that facilitate the production of hydrocarbons, including oil wells and oil and gas wells.

Creating a hydrocarbon well typically involves several stages, including a drilling stage, a completion stage and a production stage. The drilling stage normally involves drilling a wellbore into a subsurface formation that is expected to contain a concentration of hydrocarbons that can be produced. The portion of the subsurface formation expected to contain hydrocarbons is often referred to as a "hydrocarbon reservoir" or "reservoir."

Extended reach drilling (ERD) refers to drilling directional wells in which the drilled horizontal reach (HR) attained at total depth (TD) exceeded the true vertical depth (TVD) by a factor greater than or equal to two. ERD is particularly challenging for directional drilling and requires specialized planning to execute well construction.

ERD includes deep wells with horizontal distance-to-depth, or H:V, ratios less than two. The drilling industry's ERD database classifies wells, with increasing degree of well construction complexity, into low-, medium-, extended- and very extended-reach wells. Construction complexity depends on many factors, including water depth (for offshore wells), rig capability, geologic constraints and overall TVD. For example, a vertical well with TVD greater than 7,620 m (25,000 ft) is considered an extended-reach well. Also, depending on the conditions, drilling a well in deep water or through salt may be classified as ERD even if the horizontal extent of the well is not more than twice its TVD.

SUMMARY

In ERD applications, composite drill pipes can provide advantages over other available ERD drill pipe solutions, such as aluminum drill pipes or tapered drill pipe solutions, because they are lighter in construction when compared to steel drill pipes. Composite drill pipes are typically 40-50% lighter than steel drill pipes, reduce stuck pipe issues, and increase the possible drilling reach. Dual channel drill pipes or 'concentric' drill pipes are also used for drilling in loss situations and ERD. Conventionally, dual channel drill pipes are manufactured using either aluminum or steel. Dual channel drill pipes have been used by either pumping air down one of the drill pipe channels and assisting the lift of mud or by using the drill string to circulate mud such that the annulus is effectively static, therefore removing equivalent circulating density (ECD) issues. ECD is the effective density exerted by a circulating fluid against the formation that takes into account the pressure drop in the annulus above the point being considered. ECD is an important parameter in avoiding kicks and losses, particularly in wells that have a narrow window between the fracture gradient and pore-pressure gradient.

Accordingly, one example embodiment is a composite drill pipe including an inner pipe having a first diameter, the inner pipe forming an inner flow channel, and an outer pipe having a second diameter greater than the first diameter. The inner pipe and the outer pipe share a common axis, and a plurality of outer flow channels are formed between the inner pipe and the outer pipe. The plurality of outer flow channels may be formed by a plurality of walls extending radially between an outer diameter of the inner pipe and an inner diameter of the outer pipe. The inner pipe, the outer pipe, or the plurality of walls may include a reinforcing fiber, which may be selected from the group consisting of glass, carbon, steel, and aramid fibers. The inner pipe, the outer pipe, or the plurality of walls may also include a matrix material, which may be selected from the group consisting of a polymer and ceramic. In one embodiment, the inner pipe, the outer pipe, and the plurality of walls are pultruded as one piece using a reinforcing fiber and a matrix material. In one embodiment, a multi-directional reinforcement is provided over an outer diameter of the outer pipe. The multi-direction reinforcement may include a reinforcing fiber, which may be selected from the group consisting of glass, carbon, steel, and aramid fibers. The composite drill pipe may also include a polymeric resin coating that at least partially or fully encapsulates the multi-directional reinforcement. In one embodiment, the inner pipe, the outer pipe, and the plurality of walls are formed using three-dimensional weaving. The composite drill pipe may also include one or more sensors embedded in the inner pipe, outer pipe, or the walls, the one or more sensors configured to collect data relating to one or more characteristics of a subsurface formation or ambient environment. It may further include a transceiver operatively coupled to the one or more sensors, the transceiver configured to send the data collected by the sensors, or receive data from above the surface.

Another example embodiment is a method of forming a composite drill pipe. The method includes pultruding a drill pipe including an inner pipe having a first diameter, an outer pipe having a second diameter greater than the first diameter, a plurality of flow channels formed between the inner pipe and the outer pipe, and providing a multi-directional reinforcement over an outer diameter of the outer pipe, wherein the multi-direction reinforcement includes a reinforcing fiber. The multi-directional reinforcement may be provided by winding a filament onto the outer diameter of the outer pipe in a plurality of directions. In one embodiment, the multi-directional reinforcement is braided, bi-axially braided, tri-axially braided, warp knitted, weft knitted, or tubular woven. The method may also include providing a polymeric resin coating that at least partially or fully encapsulates the multi-directional reinforcement.

Another example embodiment is a method for connecting a drill pipe to an end coupling. The method includes pultruding a drill pipe including an inner pipe having a first diameter, an outer pipe having a second diameter greater than the first diameter, a plurality of flow channels formed between the inner pipe and the outer pipe. The method further includes inserting the end coupling into one end of the drill pipe such that a plurality of protruding elements of the end coupling are inserted in the plurality of flow channels, thereby forming a coupling interface between the drill pipe and the end coupling. The method further includes providing a multi-directional reinforcement over an outer diameter of the outer pipe and at least a portion of the end coupling adjoining the drill pipe, thereby integrally connecting the drill pipe and the end coupling. The multi-directional reinforcement may be provided by winding a filament onto the outer diameter of the outer pipe in a plurality of directions. The method may further include providing a polymeric resin coating that at least partially or fully encapsulates the multi-directional reinforcement.

BRIEF DESCRIPTION OF DRAWINGS

The foregoing aspects, features, and advantages of embodiments of the present disclosure will further be appreciated when considered with reference to the following description of embodiments and accompanying drawings. In describing embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

For simplicity and clarity of illustration, the drawing figures illustrate the general manner of construction, and descriptions and details of well-known features and techniques may be omitted to avoid unnecessarily obscuring the discussion of the described embodiments. Additionally, elements in the drawing figures are not necessarily drawn to scale. For example, the dimensions of some of the elements in the figures may be exaggerated relative to other elements to help improve understanding of the embodiments. Like reference numerals refer to like elements throughout the specification.

FIG. 4A illustrates an example step in a method for connecting a dual-channel composite drill pipe to an end coupling, according to one or more example embodiments.

FIG. 4B illustrates an example step in a method for connecting a dual-channel composite drill pipe to an end coupling, according to one or more example embodiments.

DETAILED DESCRIPTION

The methods and systems of the present disclosure will now be described with reference to the accompanying drawings in which embodiments are shown. The methods and systems of the present disclosure may be in many different forms and should not be construed as limited to the illustrated embodiments set forth here; rather, these embodiments are provided so that this disclosure will be thorough and complete, and will fully convey its scope to those skilled in the art.

Figure 1:
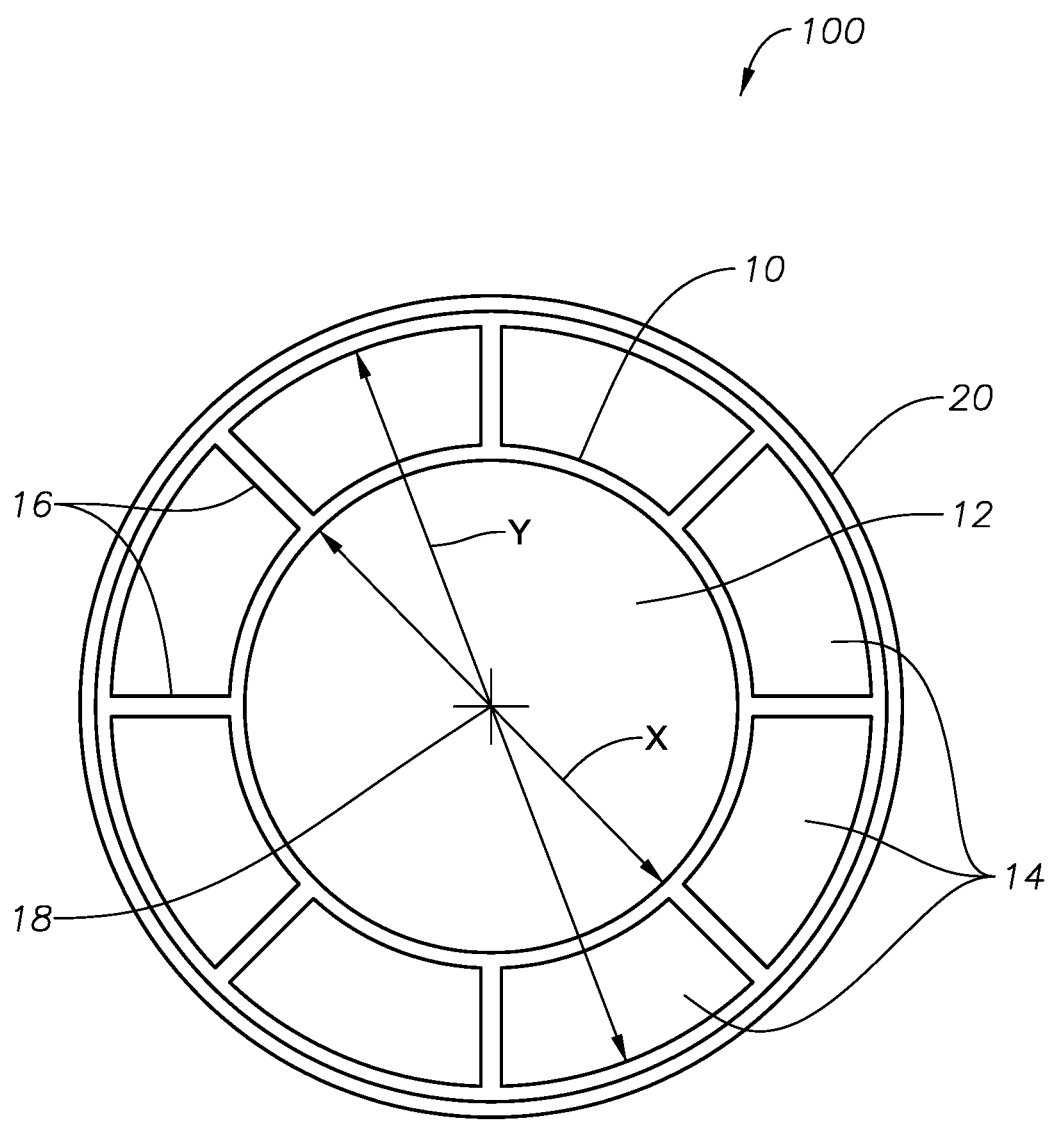
FIG. 1 illustrates a cross-sectional view of a dual-channel composite drill pipe, according to one or more example embodiments.

Turning now to the figures, FIG. 1 illustrates a cross-sectional view of a dual-channel composite drill pipe 100, according to one or more example embodiments. The composite drill pipe 100 includes an inner pipe 10 having a first diameter X. The inner pipe 10 forms an inner flow channel 12 of the dual-channel composite drill pipe 100. The composite drill pipe 100 further includes an outer pipe 20 having a second diameter Y, which is greater than the first diameter X. The inner pipe 10 and the outer pipe 20 share a common central axis 18. A plurality of outer flow channels 14 are formed between the inner pipe 10 and the outer pipe 20 by a plurality of walls 16 extending radially between an outer diameter of the inner pipe 10 and an inner diameter of the outer pipe 20. The inner pipe 10, the outer pipe 20, or the plurality of walls 16 may include a reinforcing fiber, which may be selected from glass, carbon, steel, and aramid fibers. The inner pipe 10, the outer pipe 20, or the plurality of walls 16 may also include a matrix material, which may be selected from a polymer and ceramic.

Figure 2A:
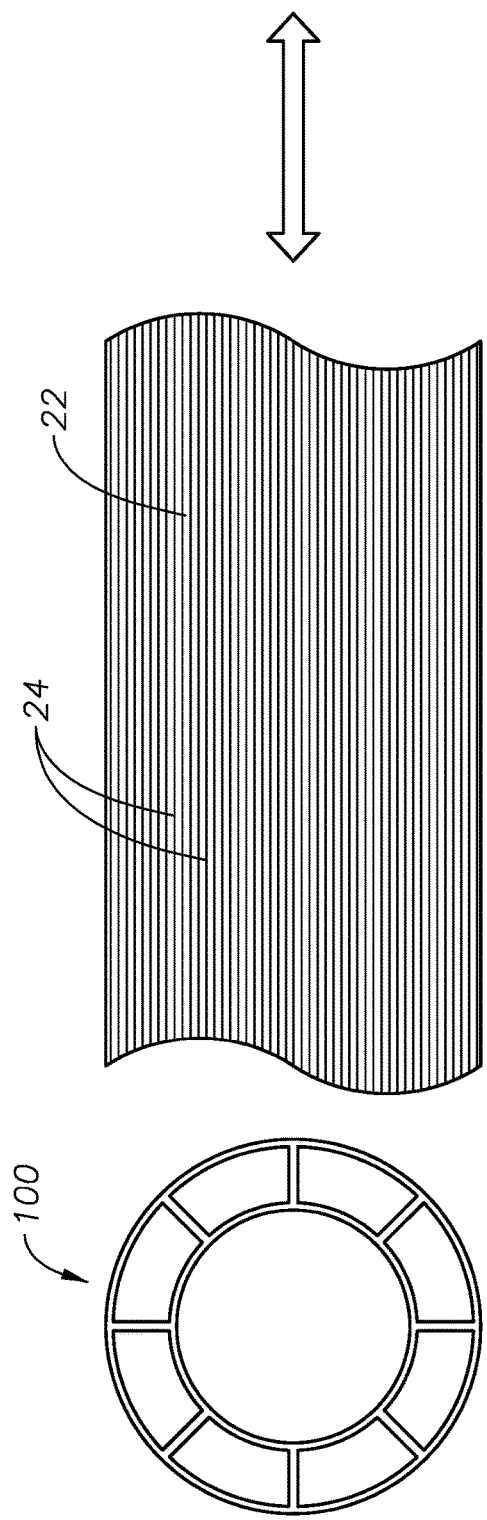
FIG. 2A illustrates an example step in a method for forming a dual-channel composite drill pipe, according to one or more example embodiments.

In one embodiment, the composite drill pipe 100 including inner pipe 10, the outer pipe 20, and the plurality of walls 16 is pultruded as one piece using a reinforcing fiber and a matrix material. FIG. 2A illustrates an example step in a method for forming a dual-channel composite drill pipe 100, according to one or more example embodiments. The process is a low-cost continuous process where the reinforcing fibers (glass, carbon, or aramid) 24 are pulled through a heated resin bath containing a polymeric resin 22, and then formed into specific shapes as it passes through forming guides or bushings. The material then moves through a heated die where it takes its final form and cures. Pultrusion produces smooth finished parts that do not require post processing and can be custom-tailored to fit specific applications.

Pultrusion is a manufacturing process for producing continuous lengths of fiber reinforced plastic shapes, with a constant cross section. While pultrusion machines vary in design, the process is basically the same. Starting with the fiber reinforcement, reels of unidirectional roving provide longitudinal tensile strength or the strength along the length of the profile. Rolls of continuous filament mat, woven roving, or stitch fabric, provide the profile with its transverse properties, or its strength across the width of the profile. All reinforcements are first fed through preforming guides that will begin to shape the raw fibers into the finished profile. The fiber is then pulled into a resin bath that saturates or wets out the reinforcements. The resin bath contains a mixture of resin, most commonly polyester or vinyl ester, pigments to add color, filler to enhance properties, and a catalyst to aid in curing or to turn it from a liquid to a solid. Surfacing veil is added to give the profile a resin-rich surface and enhance the appearance of the final product. The wet out reinforcements now enter the heated pultrusion dye. The heat begins the thermosetting reaction process that cures the finished profile. The cured profile is now advanced by a caterpillar-style puller to the cut-off saw where it will be cut to its final length.

Figure 2B:
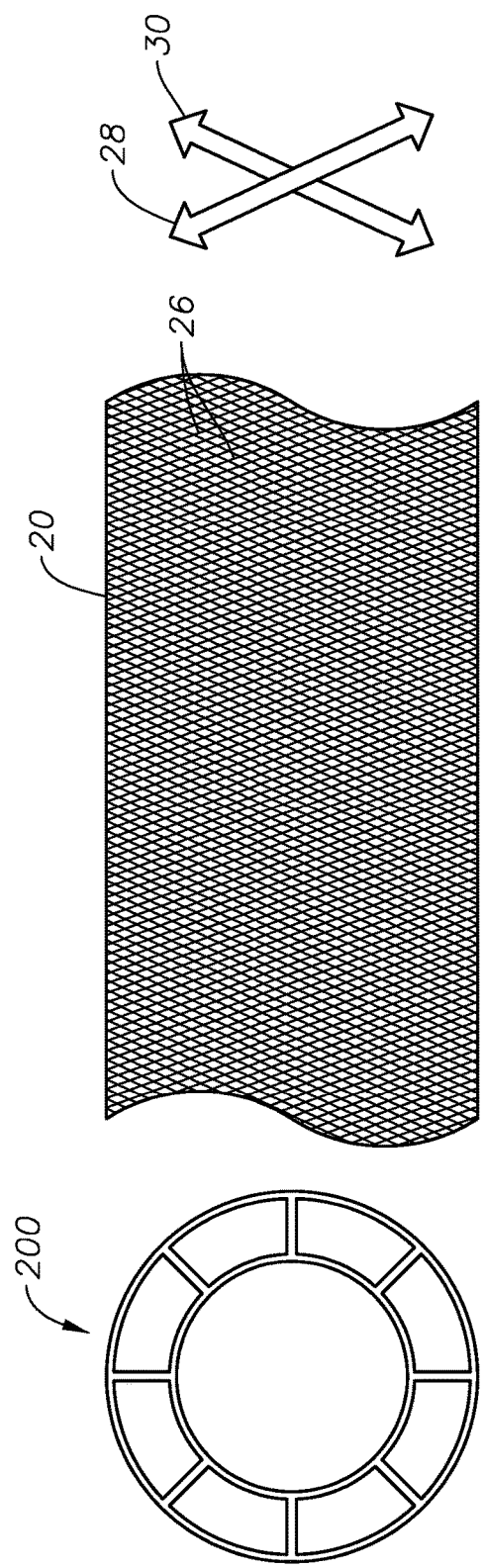
FIG. 2B illustrates an example step in a method for forming a dual-channel composite drill pipe, according to one or more example embodiments.

FIG. 2B illustrates an example second step in a method for forming a dual-channel composite drill pipe 200, according to one or more example embodiments. A multi-directional reinforcement 26 is provided over an outer diameter of the outer pipe 20. The multi-direction reinforcement 26 may include a reinforcing fiber, which may be selected from the group consisting of glass, carbon, steel, and aramid fibers. The composite drill pipe 200 may also include a polymeric resin coating that at least partially or fully encapsulates the multi-directional reinforcement 26.

In one embodiment, the multi-directional reinforcement 26 may be provided over the outer pipe by filament winding. Filament winding is a continuous fabrication method that can be highly automated and repeatable, with relatively low material costs. Typically a mandrel (not shown) is suspended horizontally between end supports and rotated, while a fiber application head moves back and forth along the length of the rotating mandrel placing fiber 26 in a predetermined lay configuration. In the example method illustrated in FIG. 2B, fiber 26 is wound or deposited in at least two directions 28 and 30. Computer-controlled filament-winding machines are available which can position the tube winding to achieve specific mechanical properties.

In one embodiment, the inner pipe, the outer pipe, and the plurality of walls may be formed using three-dimensional weaving; a three-dimensional preform with sidewalls, or at least one sidewall, provided in at least one direction. The sidewalls may be an integral part of the preform, such that fibers interweave between the preform base, or substrate, and the sidewalls to lock the components together. This advantageously produces a much higher strength joint than previous methods because there is no longer a weak bond line between the components, which eliminates the potential for delamination and improves damage tolerance. The preform is constructed from one piece of material, thus eliminating all of the time associated with cutting plies for the laminated skin and sidewalls. Further, there is not a need for a tackifier, which also saves time and cost, and eliminates the potential for compatibility problems with the primary resin. The preform is first woven as a flat preform in the form of a base fabric. The base fabric is then folded into a three-dimensional preform with a substrate portion having sidewalls in at least one direction, e.g., transverse or longitudinal, but alternatively in more than one direction, e.g., transverse and longitudinal sidewalls. The resulting woven preform can be processed into a composite component with the introduction of a matrix material using conventional techniques such as resin transfer molding or chemical vapor infiltration.

The preform may be woven with warp fibers or yarns and weft or fill fibers or yarns using a Jacquard loom or a harness loom and captured shuttle; however, any conventionally known weaving technique may be used to weave the preform. The preform can comprise any fiber that can be machine woven and may be synthetic or natural materials such as carbon, nylon, rayon, polyester, fiberglass, glass, ceramic, aramid and polyethylene. The fibers can be woven into layers, wherein each of the layers of the preform can have any weave pattern such as plain, twill, satin, and between the layers ply-to-ply, orthogonal, or angle interlock.

Typically such components consist of reinforcement materials embedded in matrix materials. The reinforcement component may be made from materials such as glass, carbon, ceramic, aramid, polyethylene, and/or other materials which exhibit desired physical, thermal, chemical and/or other properties, chief among which is great strength against stress failure. Through the use of such reinforcement materials, which ultimately become a constituent element of the completed component, the desired characteristics of the reinforcement materials, such as very high strength, are imparted to the completed composite component. The constituent reinforcement materials typically, may be woven, knitted, nonwoven or otherwise oriented into desired configurations and shapes for reinforcement preforms. Usually particular attention is paid to ensure the optimum utilization of the properties for which the constituent reinforcing materials have been selected. Usually such reinforcement preforms are combined with matrix material to form desired finished components or to produce working stock for the ultimate production of finished components.

After the desired reinforcement preform has been constructed, matrix material may be introduced to and into the preform, so that typically the reinforcement preform becomes encased in the matrix material and matrix material fills the interstitial areas between the constituent elements of the reinforcement preform. The matrix material may be any of a wide variety of materials, such as epoxy, phenolic, polyester, vinyl-ester, ceramic, carbon and/or other materials, which also exhibit desired physical, thermal, chemical and/or other properties. The materials chosen for use as the matrix may or may not be the same as that of the reinforcement preform and may or may not have comparable physical, chemical, thermal or other properties. Typically, however, they will not be of the same materials or have comparable physical, chemical, thermal or other properties, since a usual objective sought in using composites in the first place is to achieve a combination of characteristics in the finished product that is not attainable through the use of one constituent material alone. So combined, the reinforcement preform and the matrix material may then be cured and stabilized in the same operation by thermosetting or other known methods, and then subjected to other operations toward producing the desired component. It is significant to note at this point that after being so cured, the then solidified mass of the matrix material normally is very strongly adhered to the reinforcing material (e.g., the reinforcement preform). As a result, stress on the finished component, particularly via its matrix material acting as an adhesive between fibers, may be effectively transferred to and borne by the constituent material of the reinforcement preform.

The combination of the two manufacturing techniques, for example pultrusion and filament winding, allows the potential addition of fiber optic or electrical sensing to be easily including in the composite drill pipe. In one embodiment, new telemetry techniques may be included to provide benefits of logging operations due to the 'invisible' characteristics of composite drill pipe with respect to logging sensors. In one embodiment, the composite drill pipe 200 may also include one or more sensors embedded in the inner pipe, outer pipe, or the walls. The one or more sensors may be configured to collect data relating to one or more characteristics of a subsurface formation or ambient environment. The composite drill pipe 200 may further include a transceiver that may be operatively coupled to the one or more sensors. The transceiver may be configured to send the data collected by the sensors, or receive data from above the surface.

The inner pipe, outer pipe, or the walls may be made from materials, such as for example, carbon, nylon, rayon, polyester, fiberglass, glass, ceramic, aramid, and polyethylene, or any other material commonly known in the art. The final structure may be impregnated with a matrix material, such as for example, epoxy, polyester, vinyl-ester, ceramic, and carbon, using resin impregnation methods such as resin film infusion (RFI), resin transfer molding or chemical vapor filtration, thereby forming a three-dimensional composite structure.

Figure 3:
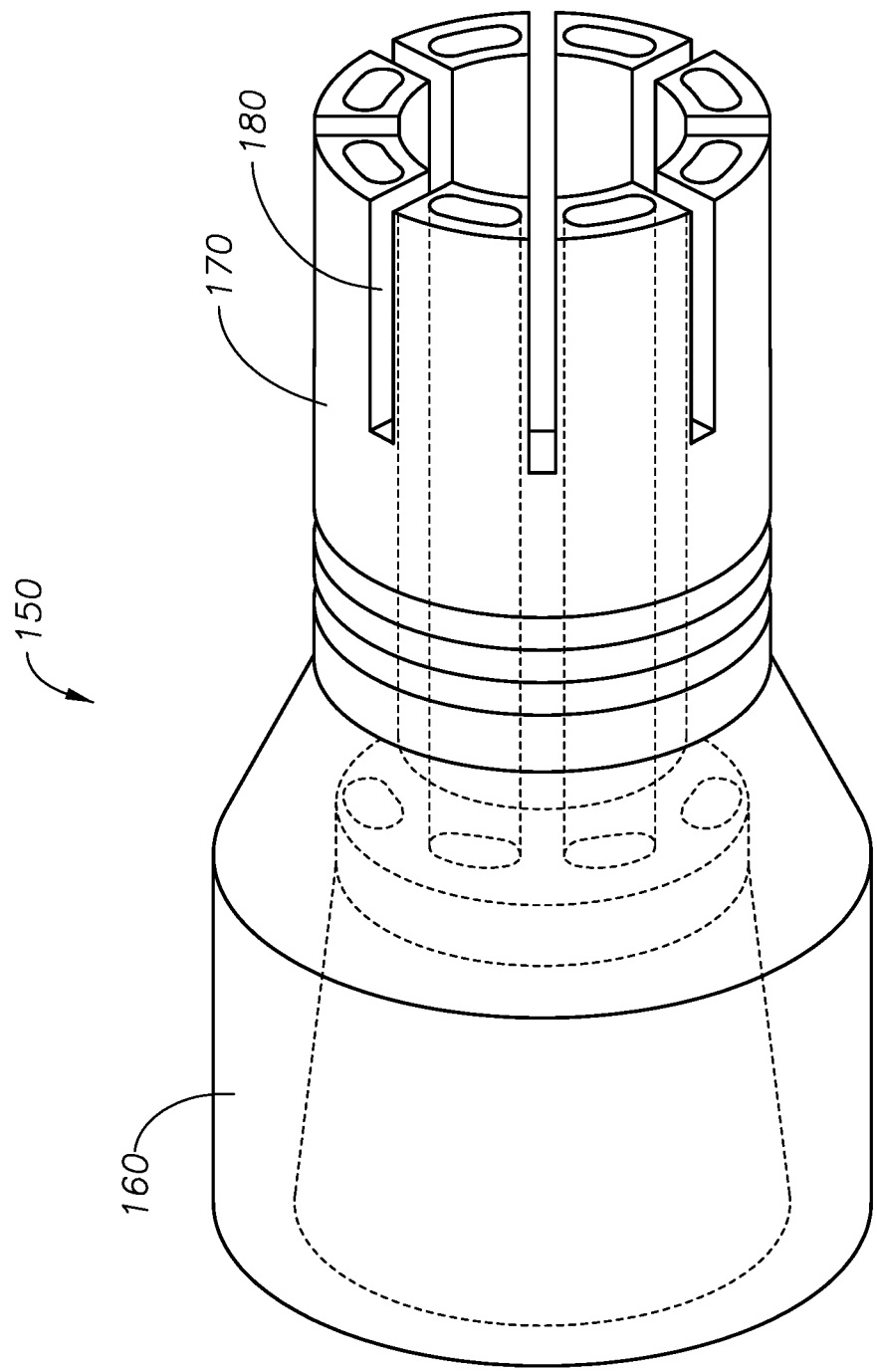
FIG. 3 illustrates an end coupling in a drill pipe, according to one or more example embodiments.

FIG. 3 illustrates an end coupling 150 in a drill pipe, according to one or more example embodiments. The coupling design includes protruding 'fingers' 170 that are separated by spaces 180 and configured to be inserted and bonded into the end of the first manufacture stage pultruded pipe. Composite drill pipe end couplings 150 are generally made from steel and from whatever grade of steel is required for a specific application. Steel end couplings 150 are used for reasons of connection thread durability and rig tong handling. The joining of the steel end couplings 150 to the composite drill pipe body 100 would be conducted during the second manufacturing stage of filament winding such that the end couplings 150 become an integral part of the composite dual channel drill pipe 100 construction providing the required mechanical properties.

FIG. 4A illustrates an example step in a method for connecting a dual-channel composite drill pipe 100 to an end coupling 150, according to one or more example embodiments. The "pin" connection is not shown but uses the same composite pipe to coupling interface. The coupling design includes through coupling flow channels 14 manufactured such that the protruding 'fingers' 170 of the coupling are inserted and bonded into the end of the first manufacture stage pultruded pipe 100. The form of the coupling 'fingers' 170 and the internal composite pipe flow channels 14 are formed in a male-female configuration such that the two components engage in a proper manner. FIG. 4B illustrates a second example step in a method for connecting a dual-channel composite drill pipe 100 to an end coupling 150, according to one or more example embodiments. The second stage of manufacture would be providing a multi-directional reinforcement by winding filament 126 over the first stage manufactured composite pipe 100 and the end coupling 150, making the coupling an integral part of the dual channel composite drill pipe 300. In one embodiment, the multi-directional reinforcement is braided, bi-axially braided, tri-axially braided, warp knitted, weft knitted, or tubular woven. The method may also include providing a polymeric resin coating that at least partially or fully encapsulates the multi-directional reinforcement.

Figure 5:
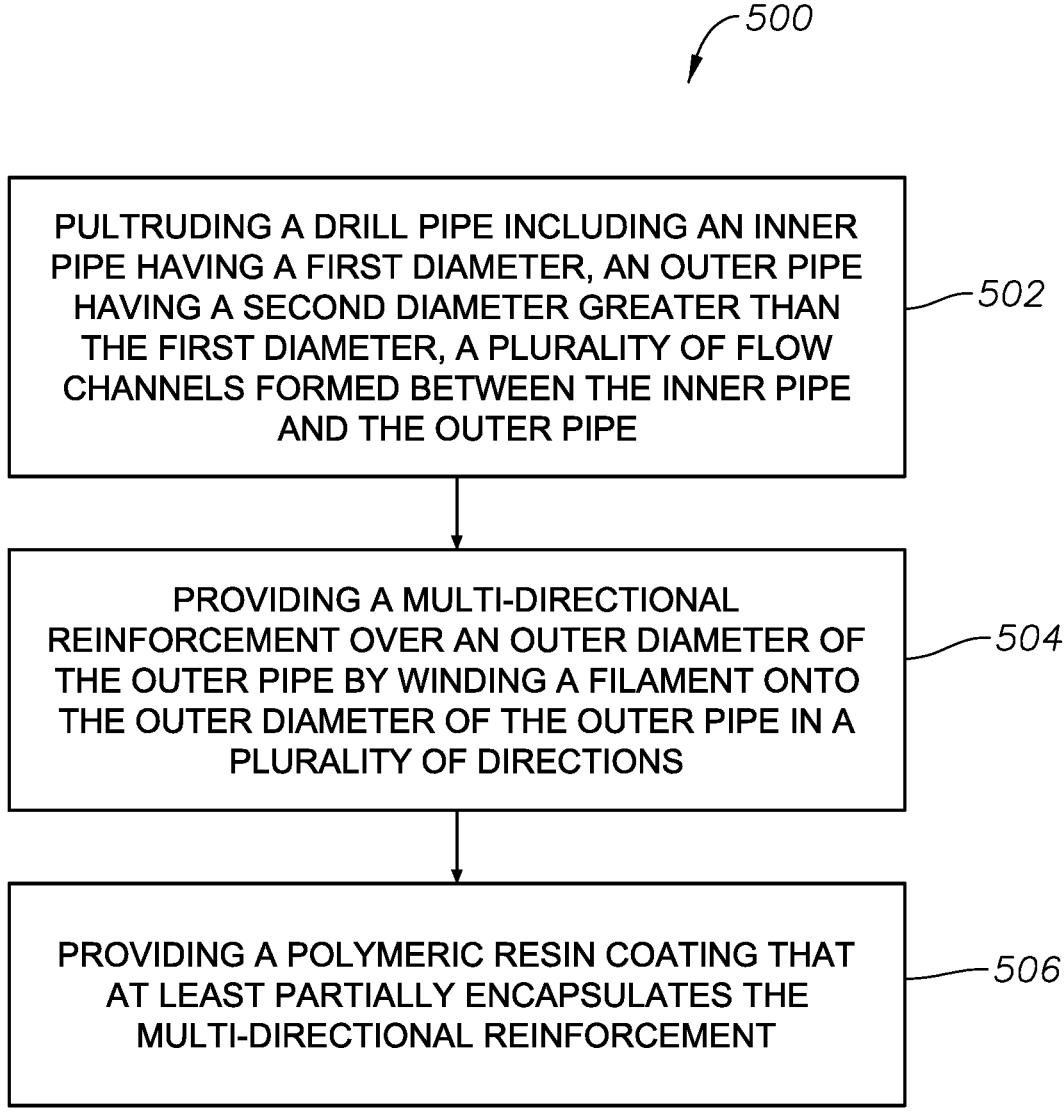
FIG. 5 illustrates example steps in a method for forming a dual-channel composite drill pipe, according to one or more example embodiments.

FIG. 5 illustrates example steps in a method 500 for forming a dual-channel composite drill pipe, according to one or more example embodiments. At step 502, the method includes pultruding a drill pipe including an inner pipe having a first diameter, an outer pipe having a second diameter greater than the first diameter, a plurality of flow channels formed between the inner pipe and the outer pipe. At step 504, the method includes providing a multi-directional reinforcement over an outer diameter of the outer pipe. The multi-direction reinforcement may be provided by winding a filament onto the outer diameter of the outer pipe in a plurality of directions. In one embodiment, the multi-directional reinforcement is braided, bi-axially braided, tri-axially braided, warp knitted, weft knitted, or tubular woven. At step 506, the method include providing a polymeric resin coating that at least partially or fully encapsulates the multi-directional reinforcement.

Figure 6:
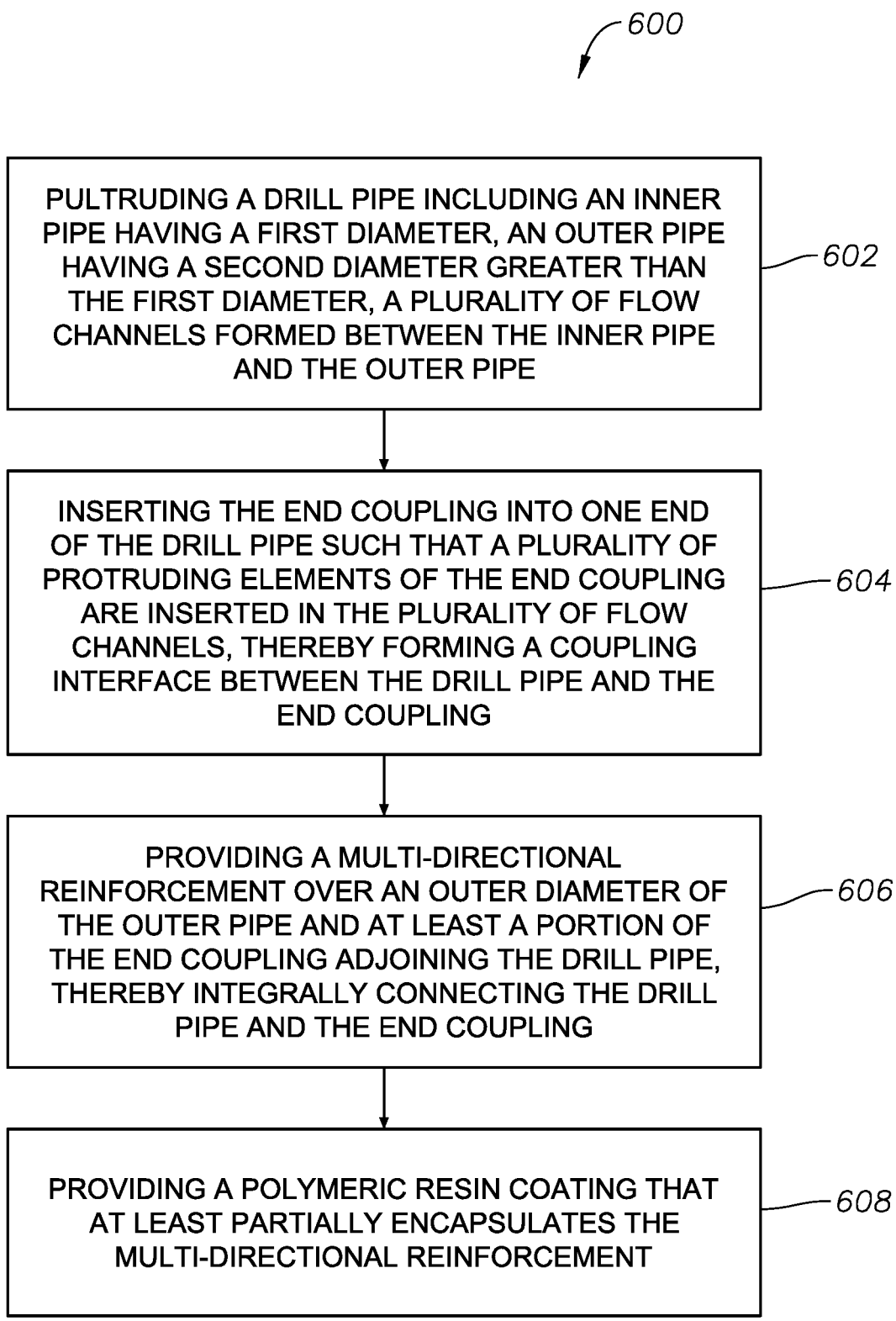
FIG. 6 illustrates example steps in a method for connecting a dual-channel composite drill pipe to an end coupling, according to one or more example embodiments.

FIG. 6 illustrates example steps in a method 600 for connecting a dual-channel composite drill pipe to an end coupling, according to one or more example embodiments. At step 602, the method includes pultruding a drill pipe including an inner pipe having a first diameter, an outer pipe having a second diameter greater than the first diameter, a plurality of flow channels formed between the inner pipe and the outer pipe. At step 604, the method further includes inserting the end coupling into one end of the drill pipe such that a plurality of protruding elements of the end coupling are inserted in the plurality of flow channels, thereby forming a coupling interface between the drill pipe and the end coupling. At step 606, the method includes providing a multi-directional reinforcement over an outer diameter of the outer pipe and at least a portion of the end coupling adjoining the drill pipe, thereby integrally connecting the drill pipe and the end coupling. The multi-directional reinforcement may be provided by winding a filament onto the outer diameter of the outer pipe in a plurality of directions. In one embodiment, the multi-directional reinforcement is braided, bi-axially braided, tri-axially braided, warp knitted, weft knitted, or tubular woven. At step 608, the method include providing a polymeric resin coating that at least partially or fully encapsulates the multi-directional reinforcement.

Combining composite and dual channel drill pipe combines the advantages of the individual products and adds advantages with respect to final product strength, lower cost and increases the number of potential applications for a single product. Pultruded internal surfaces will be smooth and therefore provide optimum flow characteristics. Composite construction is typically 40-50% lighter than steel therefore less rig hook load for ERD wells. Composite drill pipe has a higher strength to weight ratio than standard steel drill pipe as well as better corrosion resistance. Composite drill pipes are non-magnetic, which means that any signal or date acquired and transmitted by the sensors embedded in the drill pipe will have zero interference.

Pultruded internal sections are created with a stiffer construction length wise than standard composite drill pipes so they tend to be more resistant to buckling effects. Dual channel also allows for drilling to progress with a 'static' annulus, which will remove potential ECD issues, such as induced wellbore fracturing, ERD, etc. Dual channel drill pipes can also be used for air lift drilling by injecting air from surface down one channel and porting into the annulus as required.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described here are to be taken as examples of embodiments. Elements and materials may be substituted for those illustrated and described here, parts and processes may be reversed or omitted, and certain features of the embodiments may be utilized independently, all as would be apparent to one skilled in the art after having the benefit of this description of the embodiments. Changes may be made in the elements described here without departing from the spirit and scope of the embodiments as described in the following claims. Headings used here are for organizational purposes only and are not meant to be used to limit the scope of the description.

It will be appreciated that the processes and methods described here are example embodiments of processes and methods that may be employed in accordance with the techniques described here. The processes and methods may be modified to facilitate variations of their implementation and use. The order of the processes and methods and the operations provided may be changed, and various elements may be added, reordered, combined, omitted, modified, and so forth. Portions of the processes and methods may be implemented in software, hardware, or a combination of software and hardware. Some or all of the portions of the processes and methods may be implemented by one or more of the processors/modules/applications described here.

As used throughout this application, the word "may" is used in a permissive sense (meaning having the potential to), rather than the mandatory sense (meaning must). The words "include," "including," and "includes" mean including, but not limited to. As used throughout this application, the singular forms "a", "an," and "the" include plural referents unless the content clearly indicates otherwise. Thus, for example, reference to "an element" may include a combination of two or more elements. As used throughout this application, the term "or" is used in an inclusive sense, unless indicated otherwise. That is, a description of an element including A or B may refer to the element including one or both of A and B. As used throughout this application, the phrase "based on" does not limit the associated operation to being solely based on a particular item. Thus, for example, processing "based on" data A may include processing based at least in part on data A and based at least in part on data B, unless the content clearly indicates otherwise. As used throughout this application, the term "from" does not limit the associated operation to being directly from. Thus, for example, receiving an item "from" an entity may include receiving an item directly from the entity or indirectly from the entity (for example, by way of an intermediary entity). Unless specifically stated otherwise, as apparent from the discussion, it is appreciated that throughout this specification discussions utilizing terms "processing," "computing," "calculating," "determining," refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical, electronic or magnetic quantities within memories, registers, or other information storage devices, transmission devices, or display devices of the special purpose computer or similar special purpose electronic processing/computing device.

The Specification, which includes the Summary, Brief Description of the Drawings and the Detailed Description, and the appended Claims refer to particular features (including process or method steps) of the disclosure. Those of skill in the art understand that the disclosure includes all possible combinations and uses of particular features described in the Specification. Those of skill in the art understand that the disclosure is not limited to or by the description of embodiments given in the Specification.

Those of skill in the art also understand that the terminology used for describing particular embodiments does not limit the scope or breadth of the disclosure. In interpreting the Specification and appended Claims, all terms should be interpreted in the broadest possible manner consistent with the context of each term. All technical and scientific terms used in the Specification and appended Claims have the same meaning as commonly understood by one of ordinary skill in the art to which this disclosure belongs unless defined otherwise.

Conditional language, such as, among others, "can," "could," "might," or "may," unless specifically stated otherwise, or otherwise understood within the context as used, is generally intended to convey that certain implementations could include, while other implementations do not include, certain features, elements, and operations. Thus, such conditional language generally is not intended to imply that features, elements, and operations are in any way required for one or more implementations or that one or more implementations necessarily include logic for deciding, with or without user input or prompting, whether these features, elements, and operations are included or are to be performed in any particular implementation.

The systems and methods described here, therefore, are well adapted to carry out the objects and attain the ends and advantages mentioned, as well as others that are inherent. While example embodiments of the system and method have been given for purposes of disclosure, numerous changes exist in the details of procedures for accomplishing the desired results. These and other similar modifications may readily suggest themselves to those skilled in the art, and are intended to be encompassed within the spirit of the system and method disclosed here and the scope of the appended claims.

The invention claimed is:

1. A system comprising:
a composite drill pipe comprising:
an inner pipe having a first diameter, the inner pipe forming an inner flow channel;
an outer pipe having a second diameter greater than the first diameter, wherein the inner pipe and the outer pipe have a common axis; and
a plurality of outer flow channels formed between the inner pipe and the outer pipe;
an end coupling, the end coupling comprising a plurality of protruding elements corresponding to the plurality of outer flow channels,
wherein the end coupling is inserted into an end of the composite drill pipe such that the plurality of protruding elements of the end coupling are respectively inserted in the plurality of outer flow channels, thereby forming a coupling interface between the composite drill pipe and the end coupling.

2. The system according to claim 1, wherein the plurality of outer flow channels are formed by a plurality of walls extending radially between an outer diameter of the inner pipe and an inner diameter of the outer pipe.

3. The system according to claim 2, wherein the inner pipe, the outer pipe, or the plurality of walls comprise a reinforcing fiber.

4. The system according to claim 3, wherein the reinforcing fiber is selected from the group consisting of glass, carbon, steel, and aramid fibers.

5. The system according to claim 2, wherein the inner pipe, the outer pipe, or the plurality of walls comprise a matrix material.

6. The system according to claim 5, wherein the matrix material is selected from the group consisting of a polymer and ceramic.

7. The system according to claim 2, wherein the inner pipe, the outer pipe, and the plurality of walls are pultruded as one piece using a reinforcing fiber and a matrix material.

8. The system according to claim 7, wherein the reinforcing fiber is selected from the group consisting of glass, carbon, steel, and aramid fibers.

9. The system according to claim 7, further comprising:
a multi-directional reinforcement over an outer diameter of the outer pipe, wherein the multi-direction reinforcement comprises a reinforcing fiber.

10. The system according to claim 9, further comprising:
a polymeric resin coating that at least partially encapsulates the multi-directional reinforcement.

11. The system according to claim 2, wherein the inner pipe, the outer pipe, and the plurality of walls are formed using three-dimensional weaving.

12. The system according to claim 2, further comprising:
one or more sensors embedded in the inner pipe, outer pipe, or the plurality of walls, the one or more sensors configured to collect data relating to one or more characteristics of a subsurface formation or ambient environment.

13. The system according to claim 12, further comprising:
a transceiver operatively coupled to the one or more sensors, the transceiver configured to send the data collected by the sensors, or receive data from above an earth surface.

14. The system according to claim 1, further comprising:
a multi-directional reinforcement over an outer diameter of the composite drill pipe and at least a portion of the end coupling adjoining the composite drill pipe, thereby integrally connecting the composite drill pipe and the end coupling of.

* * * * *

UNITED STATES PATENT AND TRADEMARK OFFICE
CERTIFICATE OF CORRECTION

PATENT NO. : 11,225,843 B2
APPLICATION NO. : 16/528886
DATED : January 18, 2022
INVENTOR(S) : Hitchcock Page 1 of 1

It is certified that error appears in the above-identified patent and that said Letters Patent is hereby corrected as shown below:

In the Claims

In Column 11, Claim 14, Line 27 should read:
-- and the end coupling. --

Signed and Sealed this
First Day of March, 2022

Drew Hirshfeld
*Performing the Functions and Duties of the*
*Under Secretary of Commerce for Intellectual Property and*
*Director of the United States Patent and Trademark Office*